(12) United States Patent
Liu et al.

(10) Patent No.: US 7,744,956 B2
(45) Date of Patent: Jun. 29, 2010

(54) METHOD FOR FORMING A PATTERNED ARRAY OF CARBON NANOTUBES

(75) Inventors: Peng Liu, Beijing (CN); Lei-Mei Sheng, Beijing (CN); Yang Wei, Beijing (CN); Liang Liu, Beijing (CN); Li Qian, Beijing (CN); Zhao-Fu Hu, Beijing (CN); Bing-Chu Du, Beijing (CN); Pi-Jin Chen, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1000 days.

(21) Appl. No.: 11/238,881

(22) Filed: Sep. 28, 2005

(65) Prior Publication Data

US 2007/0231493 A1      Oct. 4, 2007

(30) Foreign Application Priority Data

Oct. 6, 2004      (CN) .................. 2004 1 0051806

(51) Int. Cl.
   *C23C 16/00*      (2006.01)
(52) U.S. Cl. ............................ 427/248.1; 427/249.1
(58) Field of Classification Search ............. None
   See application file for complete search history.

(56) References Cited

U.S. PATENT DOCUMENTS

| 6,440,761 B1 * | 8/2002 | Choi ..................... 438/20 |
|---|---|---|
| 6,517,995 B1 * | 2/2003 | Jacobson et al. ............. 430/320 |
| 6,923,923 B2 * | 8/2005 | Cheon et al. ................. 252/512 |
| 2001/0023986 A1 * | 9/2001 | Mancevski ................... 257/741 |
| 2003/0027478 A1 * | 2/2003 | Park et al. ..................... 445/24 |
| 2003/0165418 A1 * | 9/2003 | Ajayan et al. ............. 423/447.2 |
| 2005/0074393 A1 | 4/2005 | Wu et al. |
| 2005/0269285 A1 * | 12/2005 | Jung et al. ..................... 216/8 |
| 2006/0148370 A1 * | 7/2006 | Kadono et al. ................. 445/51 |
| 2007/0138010 A1 * | 6/2007 | Ajayan ....................... 204/400 |

FOREIGN PATENT DOCUMENTS

TW      200417509      9/2004
WO      WO 2004102604 A1 *      11/2004

* cited by examiner

*Primary Examiner*—Timothy Meeks
*Assistant Examiner*—Kelly M Gambetta
(74) *Attorney, Agent, or Firm*—D. Austin Bonderer

(57) ABSTRACT

A method for forming a patterned array of carbon nanotubes (11) includes the steps of: forming an array of carbon nanotubes on a substrate (10); imprinting the array of carbon nanotubes using a molding device (12) with a predetermined pattern; and removing the molding device, thereby leaving a patterned array of carbon nanotubes (13). The method can effectively reduce or even eliminate any shielding effect between adjacent carbon nanotubes, and is simple to implement. The field emission performance of the patterned array of carbon nanotubes is improved.

8 Claims, 4 Drawing Sheets

METHOD FOR FORMING A PATTERNED ARRAY OF CARBON NANOTUBES

BACKGROUND OF THE INVENTION

The present invention relates to methods for processing arrays of carbon nanotubes.

Carbon nanotubes were first discovered by S. Iijima (Nature, vol. 354, pp. 56-58, 1991) and were synthesized by T. W. Ebbesen and P. M. Ajayan (Nature, vol. 358, pp. 220-222, 1992). Theoretical studies show that carbon nanotubes exhibit either metallic or semiconductive behavior depending on the radii and helicity of the nanotubes. Carbon nanotubes have interesting and potentially useful electrical and mechanical properties, and offer potential for use in electronic devices such as field emission displays, micro electron sources in vacuum, and nano-scale devices. However, to realize these various potential uses, specific methods for processing arrays of the carbon nanotubes may be necessary.

For example, when arrays of carbon nanotubes are to be used in a field emission display, each array of carbon nanotubes must first be processed. This is because synthesized carbon nanotubes are generally densely configured. In a "raw" array, a shielding effect would unavoidably occur between adjacent carbon nanotubes. If the synthesized array of carbon nanotubes is directly employed as an emitting structure in a field emission display, the field emission performance of the carbon nanotubes may be impaired. Typical methods for processing an array of carbon nanotubes generally include a laser processing method, a plasma processing method, a chemical processing method, etc. These processing methods can reduce the shielding effect, lower a threshold field emission voltage, and improve the field emission performance.

A typical laser processing method was reported in an article by Zhao W J, Kawakami N, and Sawada A et al, entitled "Field Emission from Screen-printed Carbon Nanotubes Irradiated by Tunable Ultraviolet Laser in Different Atmospheres" (Journal of Vacuum Science & Technology B 21 (4), July-August, 2003, pp. 1734-1737). In this method, an array of carbon nanotubes is processed by applying an ultraviolet laser beam with a suitable wavelength and energy density for a suitable period of time. The threshold field emission voltage of a field emitter formed by the processed array of carbon nanotubes is lowered from an original $3.2V/\mu m$ to $1.2V/\mu m$. The field emission performance of the field emitter is improved accordingly.

A typical plasma processing method was reported in an article by Kanazawa Y, Oyama T, and Murakami K et al, entitled "Improvement in Electron Emission from Carbon Nanotube Cathodes after Ar Plasma Treatment" (Journal of Vacuum Science & Technology B 22 (3), May-June, 2004, pp. 1342-1344). In this method, an array of carbon nanotubes is processed by an Ar plasma with a discharge voltage of 250 volts, a radio frequency power of 60 watts, and a pressure of 40 Pa. Thus, the threshold field emission voltage of a field emitter formed by the processed array of carbon nanotubes is lowered from an original $3.3V/\mu m$ to $1.7V/\mu m$. The field emission performance of the field emitter is also improved.

However, the above-mentioned methods need to employ expensive apparatuses. The cost of processing the arrays of carbon nanotubes via any of the above-mentioned methods is unduly high. In addition, the apparatuses are relatively complicated to operate.

What is needed, therefore, is a method for processing an array of carbon nanotubes which can reduce any shielding effect between adjacent carbon nanotubes and which is simple to implement.

SUMMARY

The present invention provides a method for forming a patterned array of carbon nanotubes. A preferred embodiment of the method includes the steps of: forming an array of carbon nanotubes on a substrate; imprinting the array of carbon nanotubes using a molding device with a predetermined pattern; and removing the molding device, thereby leaving a patterned array of carbon nanotubes.

Compared with conventional processing methods for arrays of carbon nanotubes, the preferred method of the present invention has the following advantages. The pattern of the carbon nanotubes is simple to manufacture and cost-effective. Because the top portion of the array of carbon nanotubes is divided into a plurality of separate units, the shielding effect can be effectively reduced or even eliminated. The field emission performance of the processed carbon nanotubes is improved.

Other advantages and novel features will become more apparent from the following detailed description of preferred embodiments when taken in conjunction with the accompanying drawings, in which:

DETAILED DESCRIPTION OF PREFERRED EMBODIMENTS

Reference will now be made to the drawings to describe preferred embodiments of the present invention in detail.

Referring to FIGS. 1 to 4, successive stages in a method for forming a patterned array of carbon nanotubes in accordance with a preferred embodiment of the present invention are shown. The method includes the steps of:

(a) providing a substrate 10, and forming an array of carbon nanotubes 11 on the substrate 10;

(b) providing a molding device 12 with a predetermined pattern, and imprinting the array of carbon nanotubes 11 with the molding device 12; and (c) removing the molding device 12, thereby leaving the array of carbon nanotubes 13 having a pattern corresponding to the predetermined pattern of the molding device 12 defined therein.

In step (a), the substrate 10 can be made of glass, silicon, metal, or a metal oxide. The array of carbon nanotubes 11 may be formed by a deposition method, or a printing method. The deposition method may be a chemical vapor deposition method.

In step (b), the molding device 12 can be formed of a metal or nonmetal material that is easily processed, whereby the predetermined pattern can be readily defined therein. The metal material may be selected from the group consisting of iron, copper, nickel, and any alloy thereof. The nonmetal material may be selected from the group consisting of silicon, silicon oxide, silicon carbide, diamond, aluminum oxide, and ceramic material. The predetermined pattern can be selected from the group consisting of an array defining polygonal cavities, an array defining round cavities, and an array defining irregular cavities. Each polygonal cavity defines a cross-section selected from the group consisting of a triangle, a quadrangle, a pentagon, and a hexagon. The metal molding device can be made by a photolithography method. Alternatively, the metal molding device may be a wire mesh. The nonmetal molding device can be made by a photolithography method, or by a deep etching method.

Figure 1:
FIGS. 1 to 4 are schematic, side cross-sectional views showing successive stages in a method for forming a patterned array of carbon nanotubes in accordance with a preferred embodiment of the present invention.
Figure 2:
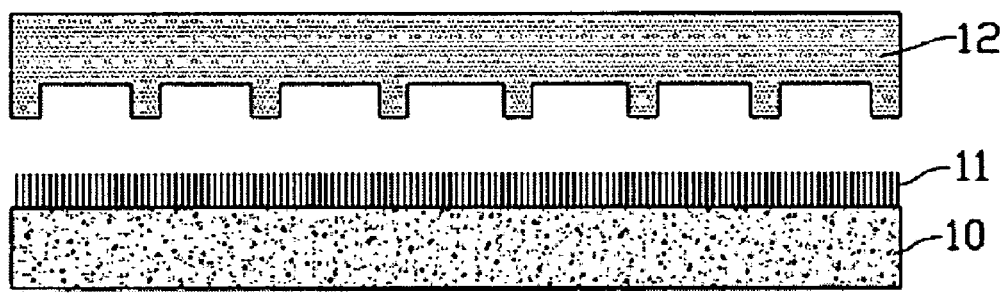
Figure 3:
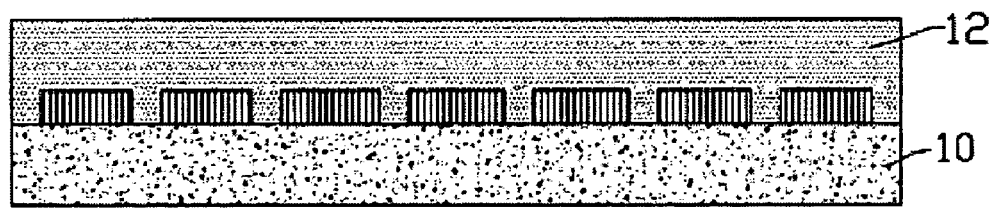
Figure 4:
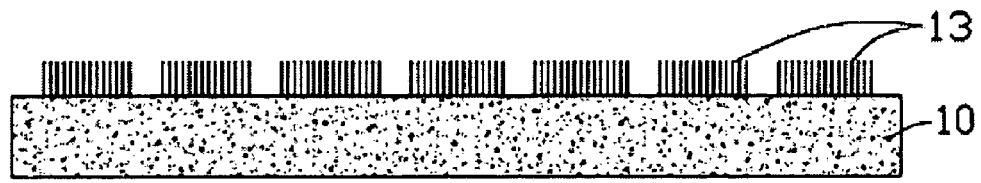
Figure 5:
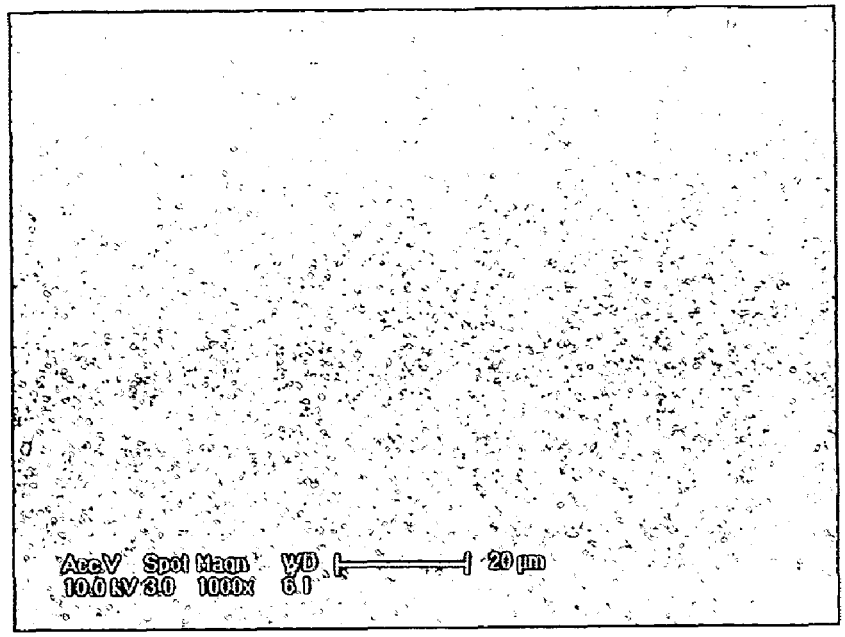
FIG. 5 is an SEM (Scanning Electron Microscope) image of the array of carbon nanotubes before their being processed, viewed from a top thereof.
Figure 6:
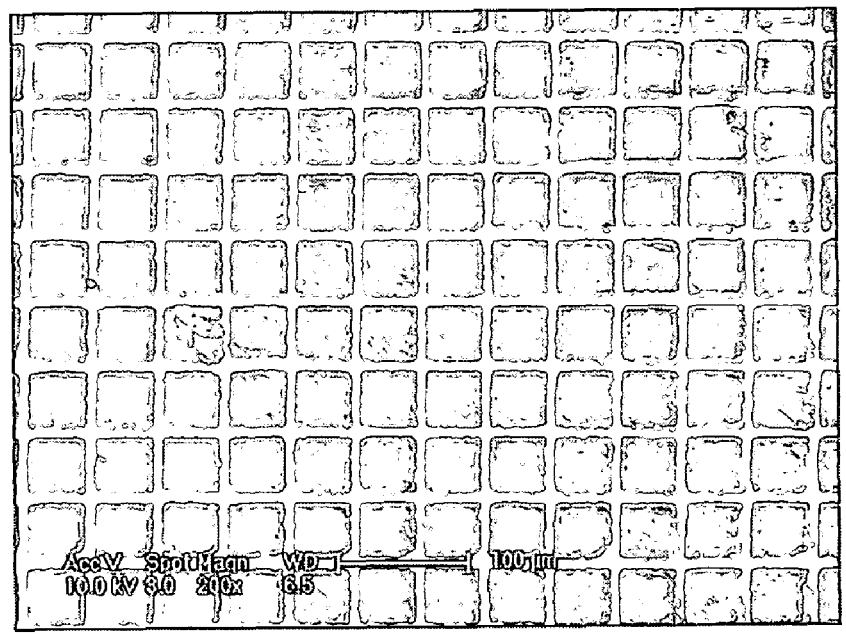
FIG. 6 is an SEM image of the array of carbon nanotubes of FIG. 5 after processing in accordance with a first exemplary embodiment of the present invention.

FIG. 5 shows an SEM image of an array of carbon nanotubes prior to their being processed. FIG. 6 is an SEM image of the array of carbon nanotubes after processing by a method in accordance with a first exemplary embodiment of the present invention. The method includes the steps of: forming an array of carbon nanotubes on a substrate via a chemical vapor deposition method; placing a metal molding device having a patterned surface on the array of carbon nanotubes with the patterned surface thereof being brought into contact with a top surface of the array of carbon nanotubes, the patterned surface having a reverse quadrangle array pattern defined by a photolithography method; placing a flat plate on the metal molding device and exerting a uniform pressure on the flat plate so as to imprint the quadrangle array pattern on a top portion of the array of carbon nanotubes; and removing the flat plate and the metal molding device, thereby leaving the array of carbon nanotubes having a quadrangle array pattern defined therein.

Figure 7:
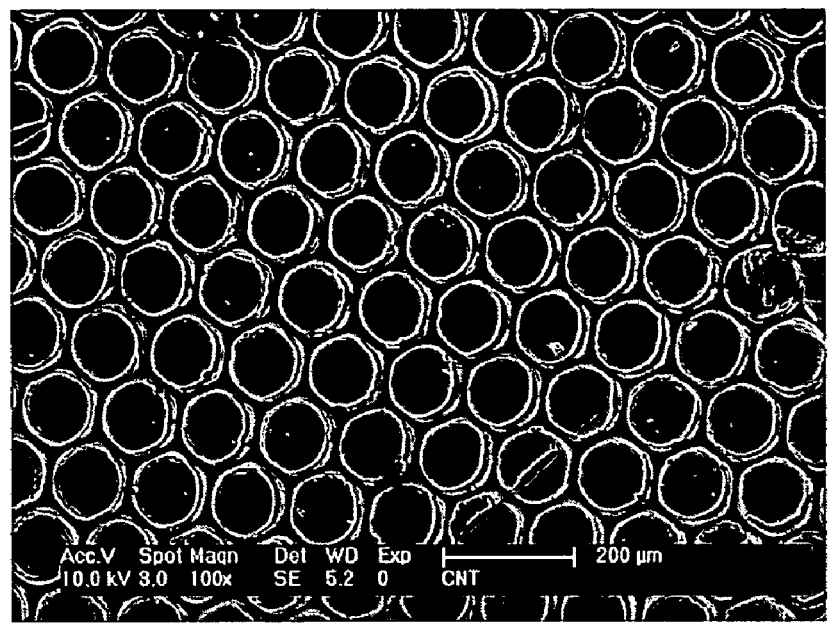
FIG. 7 is an SEM image of the array of carbon nanotubes of FIG. 5 after processing in accordance with a second exemplary embodiment of the present invention.

Referring to FIG. 7, this is an SEM image of the array of carbon nanotubes of FIG. 5 after processing by a method in accordance with a second exemplary embodiment of the present invention. The method is similar to that of the first exemplary embodiment, except that the patterned surface of the metal molding device defines an array of round cavities.

Figure 8:
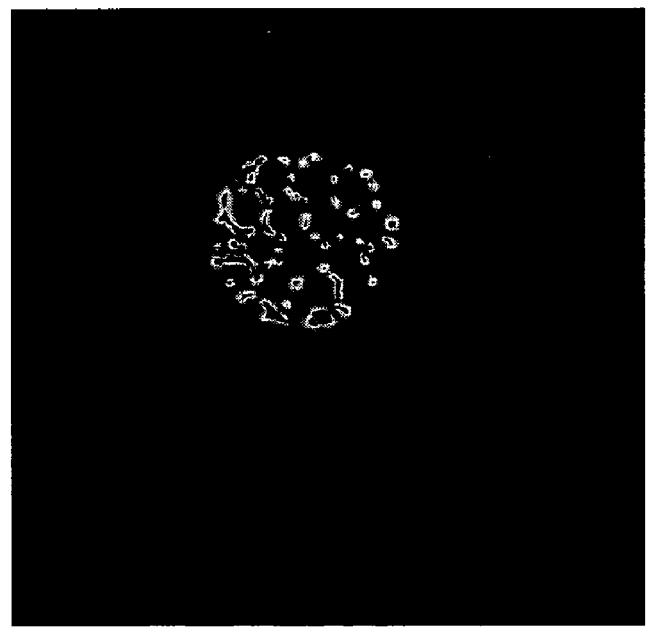
FIG. 8 is an image of light obtained by electron emission by an array of carbon nanotubes, the array having been processed in accordance with a third exemplary embodiment of the present invention.

Referring to FIG. 8, this is an image of light obtained by electron emission by an array of carbon nanotubes, the array having been processed by a method in accordance with a third exemplary embodiment of the present invention. The method is similar to that of the first exemplary embodiment, except that the patterned surface of the metal molding device defines an array of hexagonal protrusions. As seen in FIG. 8, the image of light corresponds to a pattern of the duly processed array of carbon nanotubes.

Figure 9:
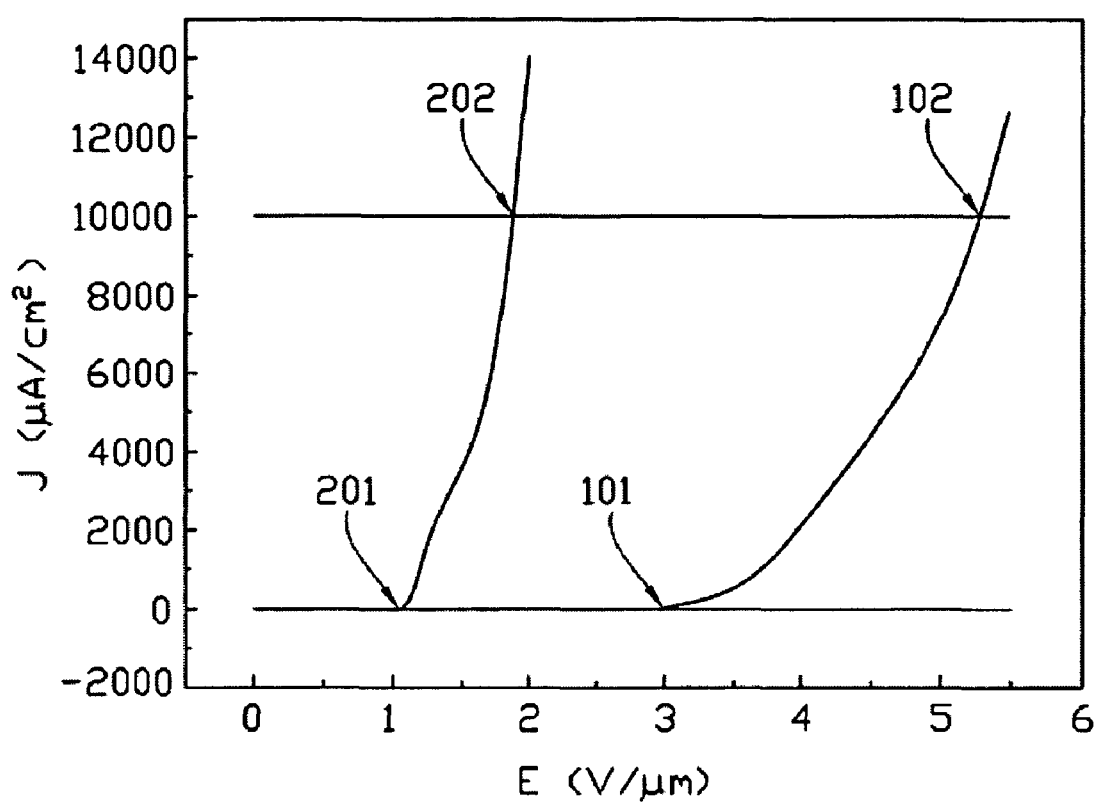
FIG. 9 is a graph that illustrates comparisons of field emission performance of an array of carbon nanotubes prior to and after processing according to the preferred embodiment of the present invention.

Referring to FIG. 9, this illustrates comparisons of field emission performance of an array of carbon nanotubes prior to and after processing according to the preferred embodiment. When a current density is 10 $\mu A/cm^2$, a corresponding threshold field emission voltage 101 of a field emitter formed by the unprocessed array of carbon nanotubes is 2.8 V/$\mu$m, while a corresponding threshold field emission voltage 201 of a field emitter formed by the processed array of carbon nanotubes is only 0.9V/$\mu$m. When the current density is 10 $mA/cm^2$, a corresponding threshold field emission voltage 102 of the field emitter formed by the unprocessed array of the carbon nanotubes is 5.3V/$\mu$m, while a corresponding threshold field emission voltage 202 of the field emitter formed by the processed array of carbon nanotubes is only 1.9V/$\mu$m. That is, compared with the field emitter formed by the unprocessed array of carbon nanotubes, the field emission performance of the field emitter formed by the processed array of carbon nanotubes is significantly improved.

Compared with conventional methods for processing arrays of carbon nanotubes, the inventive method has the following advantages. Firstly, the pattern of the carbon nanotubes is imprinted by a mechanical device, which is simple to manufacture and cost-effective. Secondly, even if the array of carbon nanotubes prior to processing is somewhat loosely organized, after being processed by the inventive method, the array of carbon nanotubes may become more compact and stable. This is because the array of carbon nanotubes is pressurized during the formation of the pattern thereon. Thirdly, because the top portion of the array of carbon nanotubes is divided into a plurality of separate units, the shielding effect can be effectively reduced or even eliminated. Additionally, some individual carbon nanotubes may extend from edges of the units. Such individual carbon nanotubes can be used as effective emitting points.

It is to be understood that the above-described embodiments are intended to illustrate rather than limit the invention. Variations may be made to the embodiments without departing from the spirit of the invention as claimed. The above-described embodiments are intended to illustrate the scope of the invention and not restrict the scope of the invention.

We claim:

1. A method for forming a patterned array of carbon nanotubes, the method comprising the steps of:
   (a) forming an array of carbon nanotubes on a substrate; and
   (b) exerting a pressure on the array of carbon nanotubes by a molding device having a pattern to imprint the array of carbon nanotubes to obtain the patterned array of carbon nanotubes; wherein the molding device is a metal wire mesh.

2. The method as claimed in claim 1, wherein the substrate is made of material selected from the group consisting of glass, silicon, metal, and a metal oxide.

3. The method as claimed in claim 1, wherein in step (a), the array of carbon nanotubes is formed by one of a deposition method and a printing method.

4. The method as claimed in claim 3, wherein the deposition method is a chemical vapor deposition method.

5. The method as claimed in claim 1, wherein the predetermined pattern of the molding device is selected from the group consisting of an array defining polygonal cavities, an array defining round cavities, and an array defining irregular cavities.

6. The method as claimed in claim 5, wherein each polygonal cavity defines a cross-section selected from the group consisting of a triangle, a quadrangle, a pentagon, and a hexagon.

7. A method for manufacturing a carbon nanotube array, the method comprising the steps of:

providing an array of carbon nanotubes;

placing a molding device having a predetermined pattern defined therein on the array of carbon nanotubes; and exerting a pressure on the molding device to imprint the array of carbon nanotubes to apply a pattern to the carbon nanotube array; wherein the molding device is a metal wire mesh.

8. The method as claimed in claim 7, further comprising a step of placing a plate on the molding device, the molding device is located between the plate and the array of carbon nanotubes after placing a molding device having a predetermined pattern defined therein on the array of carbon nanotubes.

* * * * *